Sheet 1-2 Sheets.

W. Shoup.
Pump.

№ 2949 Reissued May 26, 1868.

Witnesses.
J. V. Coombs
M. M. Livingston

Inventor.
Wm. Shoup
per Munn & Co
Attorneys.

W. Shoup
Pump.

No 2949 Reissued May 26, 1868.

Witnesses.
Jno. Coombs
M. M. Livingston

Inventor
Wm. Shoup
per Munn & Co.
Attorneys.

United States Patent Office.

WILLIAM SHOUP, OF SALTSBURG, PENNSYLVANIA.

*Letters Patent No.* 45,647, *dated December* 27, 1864; *antedated April* 26, 1862; *reissue No.* 2,949, *dated May* 26, 1868.

IMPROVEMENT IN PUMPS.

The Schedule referred to in these Letters Patent and making part of the same.

TO ALL WHOM IT MAY CONCERN:

Be it known that I, WILLIAM SHOUP, of Saltsburg, in the county of Indiana, and State of Pennsylvania, have invented a new and useful Improvement in Pump-Tubing for oil or salt-wells; and I do hereby declare that the following is a full, clear, and exact description of the same, reference being had to the accompanying drawing, making part of this specification, in which—

In each of the figures, similar letters of reference indicate corresponding parts.

Figure 1:
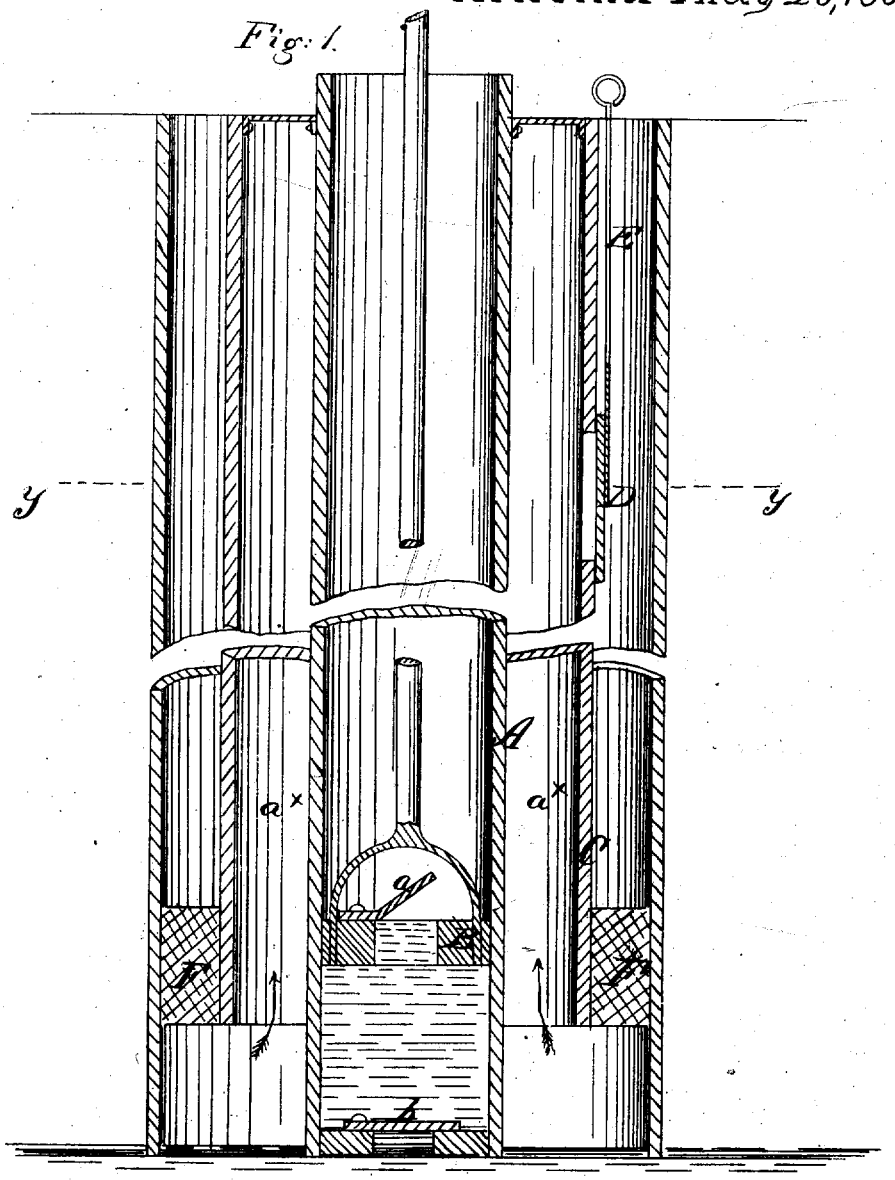
Figure 1 is a vertical central section in the line *x x* of fig. 2.
Figure 2:
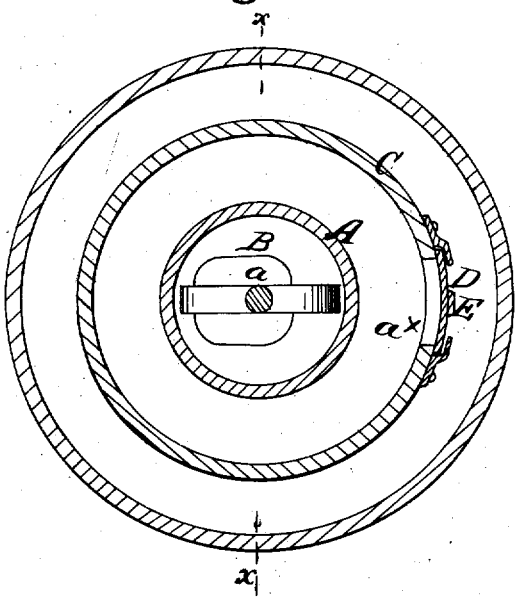
Figure 2 is a horizontal section through the line *y y* of fig. 1.

Wells bored in the earth, for procuring oil or salt water, are usually from three and a half (3½) to four and a half (4½) inches in diameter, and from one hundred (100) to six hundred (600) feet deep, varying according to the depth at which the vein of oil or of salt water is reached.

The mode of working these wells in use before my invention has been to insert in the well a single tube or pipe, extending from the surface of the ground down to the vein of oil or salt water, near the bottom of the well. This tube is the pump-tube, the valves and pump-chamber being situate at its lower end. Around and outside of this tube is placed a seed or tallow-bag, above the vein of oil or salt water to be pumped, the purpose of which is to serve as a packing between the tube and the walls of the well, and prevent the water from the veins above the seed-bag from running down and entering the vein of oil or salt water at the lower end of the pump-tube.

This arrangement was attended with some difficulties. In the first place, there is usually more or less gas in these deep oil and salt-wells, issuing from the veins which are to be worked. This gas, being prevented by the seed-bag from escaping outside of the pump-tube, is compelled to pass up through the valves of the pump, thereby greatly interfering with its action.

In the second place, where the seed-bag surrounds the pump-tube, and fills up the space between it and the well, a partial vacuum is sometimes unavoidably formed below the seed-bag, and this also greatly interferes with the operation of pumping.

In the third place, it is frequently desirable to allow some water from the upper veins to flow down to the bottom of the well, as, when the supply of oil is not sufficient to keep the pump-chamber filled, it is necessary, in order to keep the pump in operation, to supply the deficiency. By the old arrangement of a single tube and seed-bag, it is very difficult to admit any water, or, if provision is made to allow water to run through the seed-bag, it is impossible to regulate the supply of water as required.

My invention is believed fully to obviate all these difficulties, and consists in the use of double tubing, or two tubes, placed one within the other, the inner tube being the pump-tube, or connected with the pump, and the outer tube being furnished externally with a seed-bag, or other suitable packing, between it and the sides of the well, these tubes being so arranged as to leave a space around the pump-tube all the way up, while the space between the outer tube and the well is closed by packing at some point above the vein to be worked.

Thus the outer tube forms a passage or communication from the bottom to the top of the well, outside of the pump-tube, through which gas, emitted from the veins below the seed-bag, may escape without passing through the pump, and water may be admitted, if found necessary, from above the seed-bag, by means of a gate or valve in the outer tube.

To enable others skilled in the art to construct and use my improvement, I will proceed to describe it with reference to the accompanying drawings, in which—

A represents the pump-tube or cylinder, the lower end of which forms the pump-chamber, having a valve, *b*, and provided with a working piston, B, with its valve *a*, both valves, *a* and *b*, opening upwards. These parts form a lift-pump of ordinary construction, but any description of pump, suitable for artesian wells, may be employed.

C is a tube or pipe, of larger diameter than the pump-tube A, so that the pump-tube may be inserted through it into the well, and leave a space, *c*, all around the pump-tube, for the escape of gas, and the admission of water, when requisite. The tube C is of smaller diameter than the bore of the well, so as to allow the seed-bag F to be placed around the tube C, and between it and the sides of the well, thus leaving a space, *d*, around it. The seed-bag F is placed on the tube C, above the oil or salt-bearing vein which is to be worked, so as to prevent water from the surface and upper veins running down into the bottom of the well, and the tube C extends upwards so far as may be necessary to protect the space *c* around the pump-tube, usually to the top of the well.

The tube C may be furnished with a gate or valve, D, covering an aperture in the tube, at any convenient point above the seed-bag F, which is opened and shut by the rod or handle E, extending, for that purpose, to the surface of the ground, so that the gate may be opened or closed, or adjusted in a partially-closed state, as may be required.

By the arrangement described, it will be seen that all the gas is allowed to escape from the well up between the tubes A and C, instead of being obliged to pass through the pump-chamber, and in oil-wells, when there is a deficiency of oil in the bottom of the well, water may be let in through the gate D, in such quantity as may be required.

In the old plan, where the seed-bag F was placed around the pump-tube, there was no way of letting water into the well but by perforating the seed-bag, which admitted water into the well when the pump was at rest and inoperative, and the water, thus accumulating, forced back the oil, and necessitated the raising of a large quantity of water, before the oil could be reached. My invention entirely obviates this difficulty.

Artesian wells have sometimes been tubed or curbed at points where the sides were liable to cave in, by means of tubing driven down into the well, and fitting as closely as possible to its sides, but this is entirely distinct from my invention, as, in such cases, the seed-bag is placed around the pump-tube, and between it and the driving-pipe or well-tubing, whereas, in my improvement, the tube C is used in addition to such driving-pipe, and is not placed close to the sides of the well, and has the seed-bag outside of it.

Having thus described my invention, what I claim as new, and desire to secure by Letters Patent, is—

1. The combination, with the pump-tube A, of the outer tube C and seed-bag F, placed around, outside of it, irrespective of the gate or valve D, substantially as and for the purpose hereinbefore described.

2. The gate or valve D, in combination with the tube C and pump-tube A, arranged as described, for the purpose set forth.

In testimony whereof, I, the said WILLIAM SHOUP, have hereunto set my hand.

WILLIAM SHOUP.

Witnesses:

H. W. WEIR,
G. H. CHRISTY,
J. M. HART,
S. S. PORTER.